(12) United States Patent
Chun

(10) Patent No.: US 7,535,892 B2
(45) Date of Patent: May 19, 2009

(54) VOICE OVER INTERNET PROTOCOL SYSTEM HAVING DYNAMIC GAIN CONTROL FUNCTION AND METHOD THEREOF

(75) Inventor: Joon-Sung Chun, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1165 days.

(21) Appl. No.: 10/778,393

(22) Filed: Feb. 17, 2004

(65) Prior Publication Data

US 2005/0259636 A1    Nov. 24, 2005

(30) Foreign Application Priority Data

Feb. 17, 2003    (KR)    .................. 10-2003-0009912

(51) Int. Cl.
*H04L 12/66* (2006.01)
(52) U.S. Cl. .................. 370/352; 370/353; 370/354; 370/355; 370/356
(58) Field of Classification Search .......... 370/352–356
See application file for complete search history.

(56) References Cited

U.S. PATENT DOCUMENTS

| 6,222,910 B1 | 4/2001 | Price et al. |
| 6,351,529 B1 | 2/2002 | Holeva |
| 7,149,474 B1 * | 12/2006 | Mikhak ............... 455/41.2 |
| 2002/0118650 A1 | 8/2002 | Jagadeesan et al. |
| 2002/0173864 A1 | 11/2002 | Smith |

FOREIGN PATENT DOCUMENTS

EP    1 071 246    1/2001

OTHER PUBLICATIONS

Riggs, Bill, British Search and Examination Report for British Application No. GB 0403222.3, dated Jul. 22, 2004.

* cited by examiner

*Primary Examiner*—Rasha S Al Aubaidi
(74) *Attorney, Agent, or Firm*—Robert E. Bushnell, Esq.

(57) ABSTRACT

A Voice over Internet Protocol (VoIP) system having a dynamic gain control function and a method for providing a gain dynamically using the same system wherein, in the process that Pulse Code Modulation (PCM) data are transformed into a VoIP packet or vice versa, a gain value is dynamically assigned according to the type of terminal equipment utilized and the PCM voice data can be amplified and outputted according to the assigned gain value. The system includes a private exchange having a gain table and a VoIP gateway for the receiving the gain value from the private exchange in order to amplify the PCM voice and transform the amplified PCM voice data into the VoIP packet or convert VoIP packets to PCM voice data and amplifying the PCM voice data.

25 Claims, 7 Drawing Sheets

VOICE OVER INTERNET PROTOCOL SYSTEM HAVING DYNAMIC GAIN CONTROL FUNCTION AND METHOD THEREOF

CLAIM OF PRIORITY

This application makes reference to, and claims all benefits accruing under 35 U.S.C. §119 from an application for VOICE OVER INTERNET PROTOCOL SYSTEM ENABLE TO CONTROL GAIN DYNAMICALLY AND METHOD THEREOF earlier filed in the Korean Intellectual Property Office on 17 Feb. 2003 and there duly assigned Serial No. 2003-9912.

BACKGROUND OF THE INVENTION

1. Field of the Invention

The present invention relates to a Voice over Internet Protocol system and, more particularly, to a Voice over Internet Protocol system having a dynamic gain control function and a method for providing a dynamic gain using the system wherein in the process of converting Pulse Code Modulation (PCM) data to a Voice over Internet Protocol packet or vice versa, a dynamic gain value is assigned in accordance with the type of call, and PCM data can be amplified and outputted in accordance with the assigned gain value.

2. Description of the Related Art

Generally, communication apparatuses connected to telephone lines include a general telephone, a facsimile, and so on. A signal intensity of a communication apparatus connected to a telephone line is changed in accordance with the distance from an exchange. That is, since the telephone line made up of a general copper wire has impedance values changing depending upon its length, a loop current relative to a fixed direct current (DC) of the exchange also changes.

Since it may be said that the change of the loop current indicates the change of the length, the change of the signal according to the distance from the exchange is proportional to the change of the loop current. So, a communication equipment user separated far from the exchange hears the other party's voice as a very low sound or never hears it under certain circumstances.

Accordingly, it is necessary to compensate a signal on the attenuating telephone line according to its distance from the exchange. And, it is possible to have the other party's voice heard well even in communication equipment separated far from the exchange by preparing a gain control circuit in the exchange and controlling a gain of a signal received from a terminal.

FIG. 1 is a view showing a representative block construction of an exemplary subscriber terminal gain control circuit of an exchange in the art.

Referring to FIG. 1, the gain control circuit of the exchange subscriber terminal includes a subscriber connector 110 for connecting the exchange to a subscriber terminal, and an amplification part 120 for amplifying a signal provided from the subscriber connector 110 to a desired level.

A subscriber terminal (not shown) to be subscribed and connected to the exchange is connected to the exchange through the subscriber connector 110.

A voice signal applied from the terminal through the subscriber connector 110 is applied to and amplified in the amplification part 120. Here, an amplifier 126 decides an amplification gain by a ratio of a first resistor 122, an input resistor, and a second resistor 124, an output resistor, and the gain can be calculated according to the following expression.

amplified gain=amplification gain ratio*20 Log ($R2/R1$)    (Expression 1)

Here, R1 and R2 indicate an input resistor and an output resistor respectively. As shown in expression 1, the amplification gain can be variable by properly controlling the ratio of the first resistor 122 of the input resistor and the second resistor 124 of the output resistor.

An analog voice signal amplified and applied from the amplification part 120 is applied to PCM converter 128 to be converted to a digital signal, and the converted digital signal is applied to a controller 130 so as to perform a process needed for exchanging.

However, in case of using the resistor 122 and the resistor 124 which have fixed values respectively, receiver sensitivity is transmitted as it is, regardless of the condition of a cable since fixed transmission and receiver gains are maintained despite the change of input state due to an external condition.

Since a call gain control circuit in the art has only a unidirectional gain value using fixed elements, it becomes difficult to control the transmission and receiver gains in accordance with characteristic of each line in the real situation that may have various states.

In order to solve this problem, a programmable gain control circuit has been developed wherein transmission and reception lines each have a number of resistors which are the same for each line in number and serially connected to each line and on/off switches are connected in parallel to the resistors so that the on/off of the switches are controlled by the controller in accordance with states of the cables and then the values of the resistors to determine the controlled transmission and receiver gains.

On the other hand, a Voice over Internet Protocol (referred to as a VoIP, hereinafter) is a communication service of new mode wherein a voice communication is performed not through an existing communication network, a Public Switch Telephone Network (referred to as a PSTN, hereinafter), but through an Internet network. Since the communication method using the Internet network uses a packet-based network different from existing communication methods, a user does not have to pay for charges of domestic/international phone lines separately so that it is possible to perform the voice communication at a lower fare.

The VoIP has a faculty of transmitting video information as well as audio information using an H.323 Protocol being an ITU-T (International Telecommunication Union—Telecommunication) standard that provides fundamental principles for voice, video, and data communications over the IP (Internet Protocol) network including the Internet. One of the H.323 entities defined in the H.323 protocol is a gatekeeper. The gatekeeper binds H.323 endpoints present in a packet-based network (i.e., an IP-based network) in one control zone defined as a "Zone", and then controls/manages the bound H.323 endpoints.

A VoIP system using the Internet network as a back-bone has an exemplary construction as shown in FIG. 2.

Referring to FIG. 2, the VoIP system has an Internet 208 used as the back-bone, and the Internet 208 is connected to gateways 206 and 210 and to personal computers 216 and 218 (referred to as PCs, hereinafter).

The gateways 206 and 210 are correspondingly connected to PSTNs 204 and 212 that also are connected to telephone terminals 202 and 214 respectively. Terminals such as the phone terminals 202 and 214 and the PCs 216 and 218 are endpoints which are capable of communicating by voices (essential), images (option) and data (option) during a one-to-one communication or a conference.

Such terminals can perform a real-time and a bidirectional communication with the gateways 206 and 210 and other terminals. The gateways 206 and 210 are elements that enable terminals (for example, PCs 216 and 218) connected to the Internet 208 being a packet-based network and terminals (for example, telephone terminals 202 and 214) connected to the PSTNs 204 and 212 or an Integrated Service Digital Network (referred to as an ISDN, hereinafter) to perform the real-time and the bidirectional communication.

Briefly, gateways 206 and 210 perform a real-time compression and a protocol transformation of voices and facsimile data inputted from the PSTNs 204 and 212 and send the data to the Internet 208.

The Internet phone (IP-phone) can be classified into 3 types according to the kind of terminal used at both ends, that is, PC to PC, PC to phone and phone to phone.

Generally, the technical principle of the Internet phone is made up of a voice encoding and compressing technology, a real-time data transmission technology, a packet recovery technology, a gateway technology, and so on.

The voice encoding technology employs a low bit rate, high compression rate and high voice quality encoding technique in order to transmit the voice information without damaging the voice quality.

The voice encoding technology includes a PCM, an adaptive prediction coding, a Global System for Mobile communication (referred to as GSM, hereinafter), a Linear Predictive Coding (referred to as LPC, hereinafter), and so on, and the above technologies are now used. The real-time transformation technology includes a Real Time Transport Protocol (referred to as RTP, hereinafter). The RTP receives much recognition in the transmission quality over the Internet and is mainly used since 1995.

Also, a gateway embodying technology is to embody a gateway which is a network connection apparatus transforming analog voice information in order to transmit the information from an existing line exchange network to a packet exchange network.

A basic function of the gateway is processed in a digital signal processor. The gateway performs a voice compression capability using a compression algorithm, a waiting capability, and a removal capability so that it is possible to transform and transmit PCM voice data to a VoIP packet, and vice versa.

Here, in the process that the digital signal processor transforms the PCM data into the VoIP packet by performing the voice compression capability using the compression algorithm, the waiting capability, and the removal capability, the strength of voice may become too low or too high. Therefore, the gateway has a capability of controlling a gain value before compressing the PCM data to the VoIP packet, like the gain controlling circuit in the exchange described above.

However, since the gain value in the gateway is already assigned by the operator as a fixed value (of course, the gain value is generally determined by a test according to an environmental characteristic of the gateway), it is difficult to dynamically change the gain value according to the kind of call.

SUMMARY OF THE INVENTION

Therefore, the present invention has been made in view of the above problem, and it is an object of the present invention to provide a VoIP system having a dynamic gain control capability and a method for providing a dynamic gain using the system wherein in case that the VoIP gateway operates in an interworking state with a key telephone or a private exchange, a gain value can be dynamically assigned according to the type of call.

In accordance with an aspect of the present invention, there is provided a Voice over Internet Protocol (VoIP) system having a dynamic gain control function, comprising: a private exchange, on receiving a call setup signal from an extension telephone, for determining the type of telephone using an extension number of the telephone and transmitting a gain value assigned according to the type of determined telephone; and a VoIP gateway for a) receiving the gain value from the private exchange, storing the value, amplifying PCM voice data transmitted from the private exchange according to the stored gain value when a call setup is completed, transforming the amplified PCM voice data into a VoIP packet and transmitting the packet to a receiver, and b) transforming the VoIP packet transmitted from the receiver into PCM voice data, amplifying the transformed PCM voice data according to the stored gain value, and transmitting the amplified data to the private exchange.

In accordance with another aspect of the present invention, there is provided a Voice over Internet Protocol (VoIP) system having a dynamic gain control function, comprising: a private exchange, on receiving a call setup signal from an extension telephone, for determining the type of receiver using a telephone number of the receiver and transmitting a gain value assigned according to the type of determined receiver; and a VoIP gateway for a) receiving the gain value from the private exchange, storing the value, amplifying PCM voice data transmitted from the private exchange according to the gain value stored when a call setup is completed, transforming the amplified PCM voice data into a VoIP packet and transmitting the packet to the receiver, and b) transforming the VoIP packet transmitted from the receiver into PCM voice data, amplifying the transformed PCM voice data according to the stored gain value, and transmitting the amplified data to the private exchange.

In accordance with another aspect of the present invention, there is provided a Voice over Internet Protocol (VoIP) system having a dynamic gain control function, comprising: a private exchange, on receiving a call setup signal from an extension telephone, for determining the type of telephone using an extension number, determining the type of receiver using a telephone number of the receiver, and transmitting a gain value assigned according to the type of determined receiver and the receiver; and a VoIP gateway for a) receiving the gain value from the private exchange, storing the value, amplifying PCM voice data transmitted from the private exchange according to the stored gain value when a call setup is completed, transforming the amplified PCM voice data into a VoIP packet and transmitting the packet to the receiver, and b) transforming the VoIP packet transmitted from the receiver into the PCM voice data, amplifying the transformed PCM voice data according to the stored gain value, and transmitting the amplified data to the private exchange.

Preferably, the system in accordance with the present invention further comprises a gatekeeper for, on receiving the call setup signal whose receiver is the extension telephone of the private exchange, determining the type of telephone using the telephone number of the receiver and transmitting the gain value assigned according to the type of determined telephone to the VoIP gateway, and wherein the VoIP gateway a) stores the gain value transmitted from the gatekeeper, transforms the VoIP packet transmitted from the sender to the PCM voice data when the call setup is completed, amplifies the transformed PCM voice data and transmits the data to the private exchange, and b) amplifies the PCM voice data transmitted from the private exchange according to the stored gain value, transforms the amplified data into the VoIP packet and transmits the data to the sender.

Preferably, the system in accordance with the present invention further comprises a gatekeeper for, on receiving the call setup signal whose receiver is the extension telephone of the private exchange, determining the type of sender using an IP address of the sender, and transmitting the gain value assigned according to the determined sender to the VoIP gateway, and wherein the VoIP gateway a) stores the gain value transmitted from the gatekeeper, transforms the VoIP packet 11 transmitted from the sender to the PCM voice data when the call setup is completed, amplifies the transformed PCM voice data and transmits the data to the private exchange, and b) amplifies the PCM voice data transmitted from the private exchange according to the stored gain value, transforms the amplified data into the VoIP packet and transmits the data to the sender.

Preferably, the system in accordance with the present invention further comprises a gatekeeper for, on receiving the call setup signal whose receiver is the extension telephone of the private exchange, determining the type of telephone of the receiver using the telephone number of the receiver, determining the type of sender using the IP address of the sender, and transmitting the gain value assigned according to the type of telephone of the determined sender and receiver to the VoIP gateway, and wherein the VoIP gateway a) stores the gain value transmitted from the gatekeeper, transforms the VoIP packet transmitted from the sender to the PCM voice data when the call setup is completed, amplifies the transformed PCM voice data and transmits the data to the private exchange, and b) amplifies the PCM voice data transmitted from the private exchange according to the stored gain value, transforms the amplified data into the VoIP packet and transmits the data to the sender.

Preferably, in the system in accordance with the present invention, the VoIP gateway includes: a Public Switched Telephone Network (PSTN) connector for providing an interface with the private exchange; an Internet network connector for providing a connection with an Internet network; a media processor for a) amplifying the PCM voice data transmitted from the private exchange through the PSTN connector according to the established gain value when the call setup is completed, transforming the amplified data into the VoIP packet and transmitting the packet to the receiver through the Internet network connector, and b) transforming the VoIP packet transmitted from the receiver through the Internet network connector into the PCM voice data, amplifying the transformed PCM voice data according to the gain value, and transmitting the amplified data to the private exchange through the PSTN connector; and a main controller for receiving the gain value from the private exchange through the PSTN connector, storing the gain value, providing the media processor with the gain value when the call setup is completed, and amplifying the PCM voice data according to the stored gain value.

Preferably, in the system in accordance with the present invention, the media processor includes: a memory for storing the gain value transmitted from the main controller; a digital signal processor for a) amplifying the PCM voice data transmitted from the private exchange through the PSTN connector according to the gain value when the call setup is completed, transforming the amplified data into the VoIP packet and transmitting the packet to the receiver through the Internet network connector, and b) transforming the VoIP packet transmitted from the receiver through the Internet network connector into the PCM voice data, amplifying the transformed PCM voice data according to the gain value and transmitting the data to the PSTN connector; and a controller for receiving the gain value from the main controller, storing the gain value in the memory, providing the digital signal processor with the gain value when the call setup is completed, and amplifying the PCM voice data according to the gain value.

Preferably, in the course that the private exchange transmits the gain value to the VoIP gateway, the private exchange transmits the gain value using a call setup message.

In accordance with another aspect of the present invention, there is provided a Voice over Internet Protocol (VoIP) system having a dynamic gain control function, comprising: a gatekeeper for, on receiving a call setup signal whose receiver is an extension telephone of a private exchange, determining the type of sender using a telephone number of the sender and transmitting a gain value assigned according to the type of determined sender; and a VoIP gateway for a) storing the gain value transmitted from the gatekeeper, transforming a VoIP packet transmitted from the sender into PCM voice data when a call setup is completed, and amplifying the transformed PCM voice data and transmitting the data to the private exchange, and b) amplifying the PCM voice data transmitted from the private exchange according to the stored gain value, transforming the data into the VoIP packet and transmitting the packet to the sender.

In accordance with another aspect of the present invention, there is provided a Voice over Internet Protocol (VoIP) system having a dynamic gain control function, comprising: a gatekeeper for, on receiving a call setup signal whose receiver is an extension telephone of a private exchange, determining the type of sender using an IP address of the sender and transmitting a gain value assigned according to the determined sender; and a VoIP gateway for a) storing the gain value transmitted from the gatekeeper, transforming a VoIP packet transmitted from the sender into PCM voice data when a call setup is completed, amplifying the transformed PCM voice data and transmitting the data to the private exchange, and b) amplifying the PCM voice data transmitted from the private exchange according to the stored gain value, transforming the data into the VoIP packet, and transmitting the packet to the sender.

In accordance with another aspect of the present invention, there is provided a Voice over Internet Protocol (VoIP) system having a dynamic gain control function, comprising: a gatekeeper for, on receiving a call setup signal whose receiver is an extension telephone of a private exchange, determining the type of telephone of a receiver using a telephone number of the receiver, determining the type of sender using an IP address of the sender, and transmitting a gain value assigned according to the type of telephone of the determined receiver and the determined sender; and a VoIP gateway for a) storing the gain value transmitted from the gatekeeper, transforming a VoIP packet transmitted from the sender into the PCM voice data when a call setup is completed, amplifying the transformed PCM voice data, and transmitting the data to the private exchange, and b) amplifying the PCM voice data transmitted from the private exchange according to the stored gain value, transforming the data into the VoIP packet, and transmitting the packet to the sender.

Preferably, in the course that the gatekeeper transmits the gain value to the VoIP gateway, the gatekeeper transmits the gain value using a call setup message.

In accordance with another aspect of the present invention, there is provided a method for providing a gain dynamically in a Voice over Internet Protocol (VoIP) system, comprising the steps of: when receiving a call setup signal from an extension telephone, determining the type of telephone by a private exchange using an extension number of the extension telephone; transmitting a gain value assigned according to the type of telephone determined in the step a) to a VoIP gateway by the private exchange; and by the VoIP gateway, storing the gain value transmitted from the private exchange and amplifying PCM voice data according to the gain value when a call setup is completed.

In accordance with another aspect of the present invention, there is provided a method for providing a gain dynamically in a Voice over Internet Protocol (VoIP) system, comprising the steps of: a) when receiving a call setup signal from an extension telephone, determining the type of receiver using a number of the receiver by a private exchange; b) transmitting a gain value assigned according to the type of receiver determined in the step a) to a VoIP gateway by the private exchange; and c) by the VoIP gateway, storing the gain value transmitted from the private exchange and amplifying PCM voice data according to the gain value when a call setup is completed.

In accordance with yet another aspect of the present invention, there is provided a method for providing a gain dynamically in a Voice over Internet Protocol (VoIP) system, comprising the steps of: a) when receiving a call setup signal from an extension telephone, by a private exchange, identifying the type of telephone of a sender using the extension number of the extension telephone and determining the type of telephone of a receiver using the number of the receiver; b) transmitting a gain value assigned according to the type of telephone of the sender and the type of telephone of the receiver determined in the step a) to a VoIP gateway by the private exchange; and c) by the VoIP gateway, storing the gain value transmitted from the private exchange and amplifying PCM voice data according to the gain value when a call setup is completed.

Preferably, the step c) includes the steps of: c-1) storing the gain value transmitted from the private exchange; c-2) amplifying the PCM voice data transmitted from the private exchange according to the gain value, transforming the data into a VoIP packet and transmitting the packet to the receiver, after the call setup is completed; and c-3) transforming the VoIP packet transmitted from the receiver into the PCM voice data, amplifying the transformed PCM voice data according to the gain value and transmitting the data to the private exchange.

Preferably, the method in accordance with the present invention further comprises the steps of: d) on receiving the call setup signal whose receiver is the extension telephone of the private exchange, determining the type of telephone using the telephone number of the receiver by the gatekeeper; transmitting the gain value assigned according to the determined type of telephone to the VoIP gateway by the gatekeeper; and by the VoIP gateway, storing the gain value transmitted from the gatekeeper and amplifying the PCM voice data according to the stored gain value when the call setup is completed.

Preferably, the method in accordance with the present invention further comprises the steps of: d) on receiving the call setup signal whose receiver is the extension telephone of the private exchange, determining the type of sender using an IP address of the sender by the gatekeeper; transmitting the gain value assigned according to the type of sender determined in the step d) to the VoIP gateway by the gatekeeper; and by the VoIP gateway, storing the gain value transmitted from the gatekeeper and amplifying the PCM voice data according to the stored gain value when the call setup is completed.

Preferably, the method of the present invention further comprises the steps of: d) on receiving the call setup signal whose receiver is the extension telephone of the private exchange, determining the type of receiver using the telephone number of the receiver and determining the type of sender using the IP address of the sender, by the gatekeeper; e) transmitting the gain value assigned according to the type of telephone of the receiver and the type of sender determined in the step d) to the VoIP gateway by the gatekeeper; and by the VoIP gateway, storing the gain value transmitted from the gatekeeper and amplifying the PCM voice data according to the stored gain value when the call setup is completed.

Preferably, the method of the present invention further comprises the steps of: d) on receiving the call setup signal whose receiver is the extension telephone of the private exchange, determining the type of telephone using the telephone number of the receiver by the gatekeeper; e) transmitting the gain value assigned according to the type of telephone determined in the step d) to the VoIP gateway by the gatekeeper; and f) by the VoIP gateway, storing the gain value transmitted from the gatekeeper and amplifying the PCM voice data according to the stored gain value when the call setup is completed.

Preferably, the method of the present invention further comprises the steps of: d) on receiving the call setup signal whose receiver is the extension telephone of the private exchange, determining the type of sender using the IP address of the sender by the gatekeeper; transmitting the gain value assigned according to the type of sender determined in the step d) to the VoIP gateway by the gatekeeper; and storing the gain value transmitted from the gatekeeper and amplifying the PCM voice data according to the stored gain value when the call setup is completed by the VoIP gateway.

Preferably, the method of the present invention further comprising the steps of: d) on receiving the call setup signal whose receiver is the extension telephone of the private exchange, determining the type of telephone of the receiver using the telephone number of the receiver, and determining the type of sender using the IP address of the sender by the gatekeeper; transmitting the gain value assigned according to the type of telephone of the receiver and the type of sender determined in the step d) to the VoIP gateway by the gatekeeper; and storing the gain value transmitted from the gatekeeper and amplifying the PCM voice data according to the stored gain value when the call setup is completed, by the VoIP gateway.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Now, a VoIP system having a dynamic gain control capability and a method for providing a dynamic gain using the system in accordance with a preferred embodiment of the present invention will be described in detail with reference to the annexed drawings.

Figure 1:
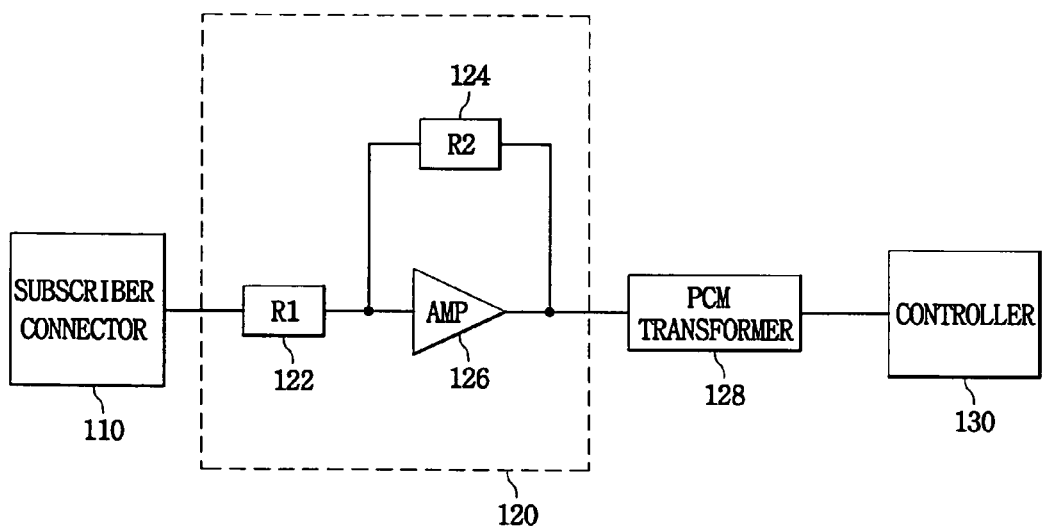
FIG. 1 is a view showing a representative block construction of an exemplary subscriber terminal gain control circuit of an exchange in the art.
Figure 2:
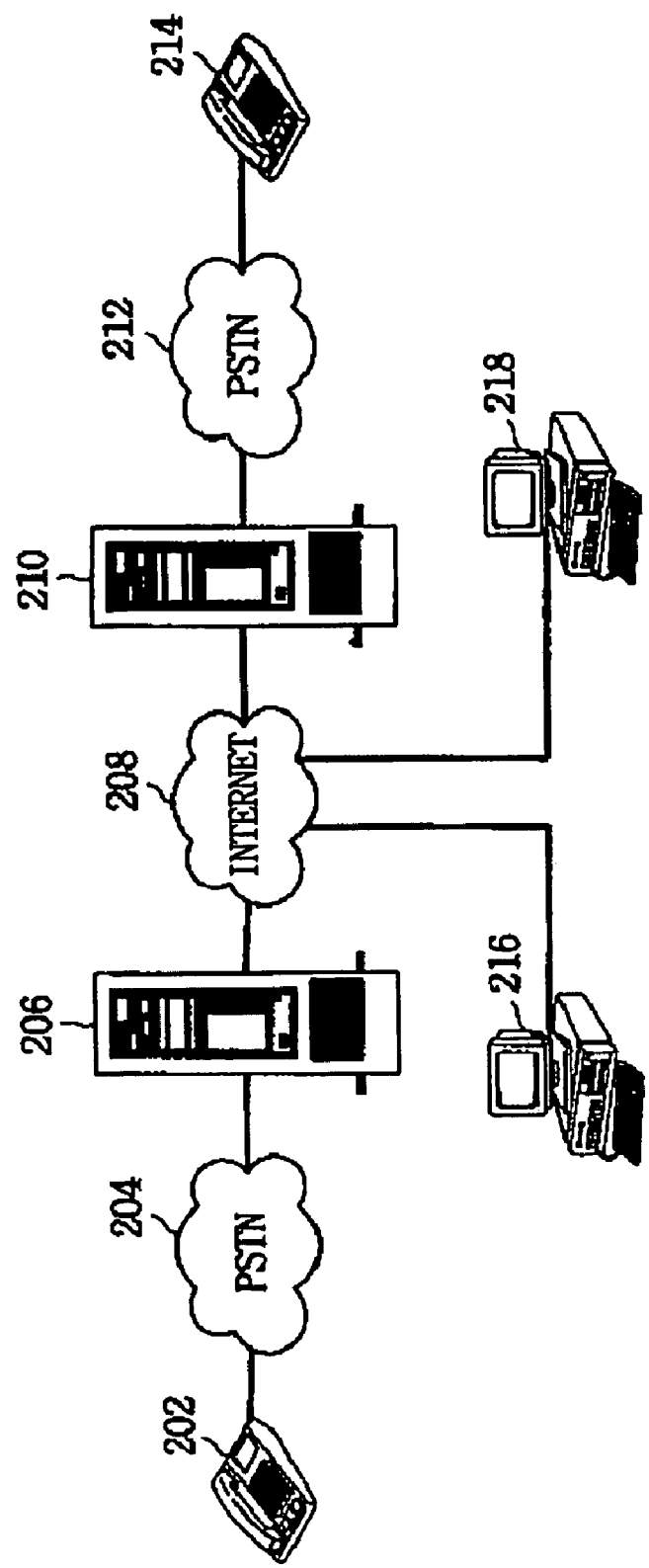
FIG. 2 is a view showing an exemplary construction of a VoIP system using a general Internet network as a back-bone.
Figure 3:
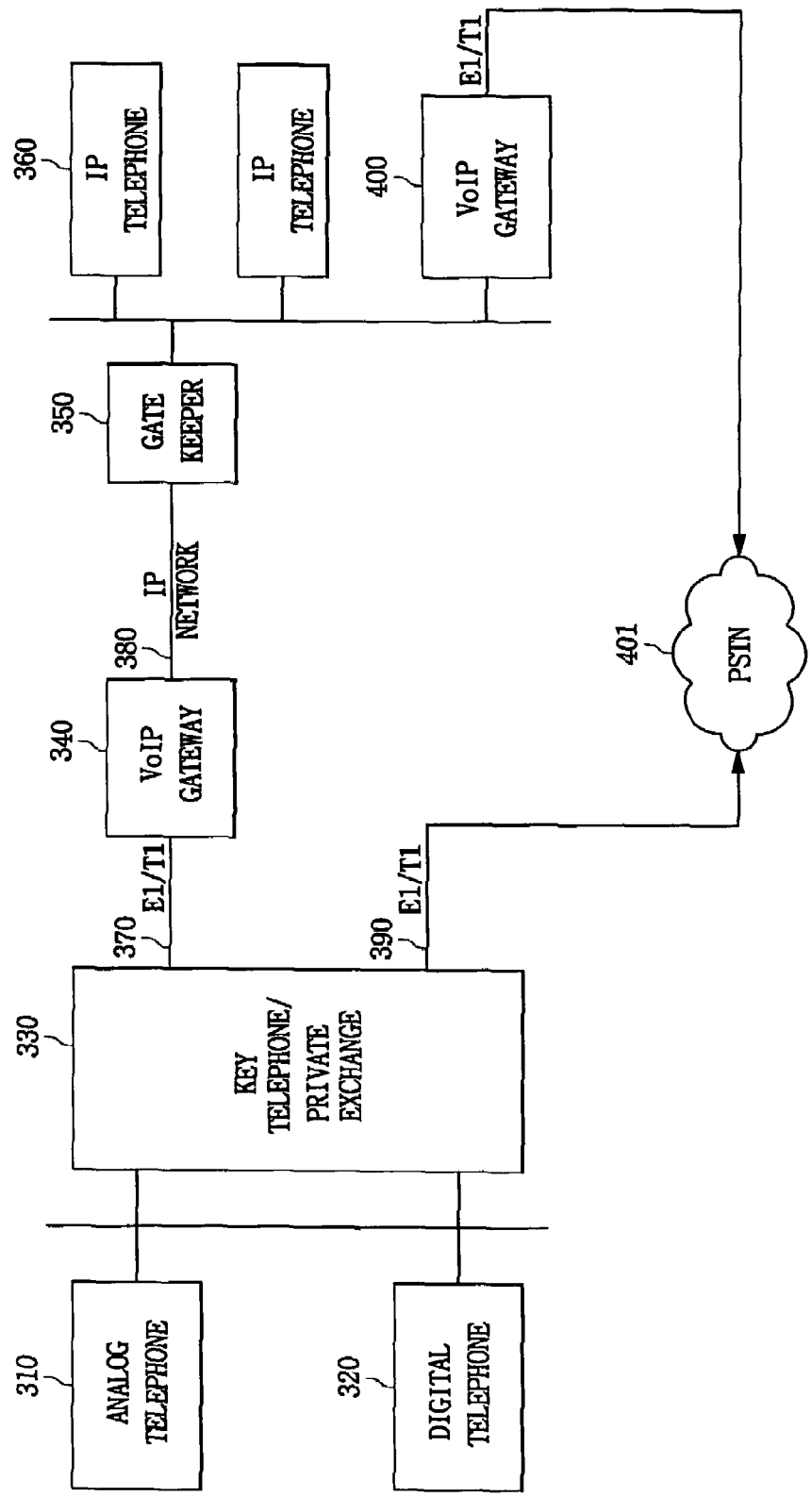
FIG. 3 is a view showing a VoIP system having a dynamic gain control capability in accordance with a preferred embodiment of the present invention.

FIG. 3 is a view showing a VoIP system having a dynamic gain control capability in accordance with a preferred embodiment of the present invention.

Referring to FIG. 3, a VoIP system having a dynamic gain control capability in accordance with a preferred embodiment of the present invention includes a key telephone/private exchange 330, a VoIP gateway 340, and a gatekeeper 350.

The key telephone/private exchange 330 is a telephone exchange system which enables a predetermined number of external telephone lines used in enterprise fields such as a public office, a company, a factory and a hotel to be shared with all members, and phone calls between internal users connected to extension lines to be connected automatically.

A main object of the key telephone/private exchange 330 is to reduce an expenditure occurring in case that all members of a public office, a company, a factory and a hotel have their own general telephone lines.

The key telephone/private exchange 330 is owned not by a telephone company but privately owned by a public office, a company, a factory and a hotel and is managed on their own responsibility. The key telephone/private exchange 330 employed an analog mode originally but the trend of it is recently changing to a digital mode.

The key telephone/private exchange 330 has an analog telephone 310 and a digital telephone 320 which are connected to it, and it provides exchange connections between one extension telephone 310 and another extension telephone 320 or between the extension telephones 310 and 320 and external telephone lines (telephone lines of telephone office via).

Here, the analog telephone 310 is a telephone used in a general home and is connected to the key telephone/private exchange 330 through an analog interface. The digital telephone 320 is a special telephone which is manufactured in order to make full use of the key telephone/private exchange, and is connected to key telephone/private exchange 330 through a digital interface.

The key telephone/private exchange 330 receives, from a manager, information on whether the connected telephone is the analog telephone 310 or the digital telephone 320, makes a database by correlating the information with the extension numbers and stores the database in it. When a call setup request is made from the connected telephones 310 and 320, the key telephone/private exchange 330 looks up the extension number and determines whether the telephone currently requesting the call setup is the analog telephone 310 or the digital telephone 320.

The information on the kind of telephone correlated with the extension number is transmitted to the gatekeeper 350 coupled tightly with the key telephone/private exchange 330 and is managed in it.

The key telephone/private exchange 330 manages a gain table shown in Table 1, below, and this gain table is used to determine an amplification ratio when the PCM voice data are amplified on the VoIP gateway 340 in accordance with the kind of sender telephones 310 and 320.

When the key telephone/private exchange 330 senses a call setup request from an extension line, it determines whether the sender telephone is an analog telephone 310 or a digital telephone 320 by identifying the extension telephone number. And, the key telephone/private exchange 330 looks up an IP address translation table transmitted from the gatekeeper 350 so as to be a database and managed by it, and determines whether the receiver (called) telephone 360 is an IP telephone 360 or a VoIP gateway 400. Here, using the called telephone number, the key telephone/private exchange finds the IP address corresponding to it and determines whether the receiver is an IP telephone 360 or a VoIP gateway 400. On the basis of the determination result, the key telephone/private exchange 330 looks up the gain table of Table 1, identifies the gain value and transmits the identified gain value to the VoIP gateway 340.

The key telephone/private exchange 330 transmits the gain table information of Table 1 to the gatekeeper 350 so as to be stored in a database and managed by it.

TABLE 1

| Receiver/sender | Analog telephone | Digital telephone | IP telephone | External VoIP gateway |
|---|---|---|---|---|
| Analog telephone | X | X | 9 db | 10 db |
| Digital telephone | X | X | 8 db | 13 db |
| IP telephone | 9 db | 8 db | X | X |
| External VoIP gateway | 10 db | 13 db | X | X |

As described above, the key telephone/private exchange 330 is installed in a building or a predetermined place and employs an external telephone line 'endowed a telephone number' from the telephone station. And, the key telephone/private exchange 330 enables the extension lines endowed their own numbers to communicate freely using the analog telephone 310 or the digital telephone 320 and provides various functions including switchover, holding, broadcasting, conference, and so on so that users can perform their businesses with ease and efficiency. The key telephone/private exchange 330 also identifies gain values and informs the VoIP gateway 340 of the gain values. So, the VoIP gateway 340 can look up the gain values when it compresses PCM voice data.

The key telephone/private exchange 330 can be connected to the VoIP gateway 340 using a digital line such as an E1/T1 370 and an analog line such as a loop line.

The key telephone/private exchange 330 can be connected to another VoIP gateway 400 outside through a PSTN (public switch telephone network) 401 using an E1/T1 390 or a loop line as an external telephone line trunk.

The VoIP gateway 340 is adapted to connect the PSTN to the VoIP network. Generally, in order to embody a VoIP voice communication, it is needed to employ protocols for controlling is call, for example, a protocol SS7 (Signaling System 7) for controlling call of the PSTN, an H.323 protocol for Internet, an SIP (Session Initiation Protocol) and so on.

The VoIP gateway 340 is needed to control an inter-transformation between a call control protocol used for an Internet and a PSTN when both networks are interworked and the media.

Generally, the VoIP gateway 340 can be classified according to its service. For example, the VoIP gateway 340 includes a built-in type gateway which is mounted on a Key Telephone System (KTS) or a Private Branch exchange (PBX) 330 as a card form, a server type gateway which is mounted on a platform such as a window Network Terminal (NT), a stand-alone type gateway which is independently constructed from other terminals, and so on.

The stand-alone type gateway can be classified into a TANDEM (Trunk and ENM (ear & mouth)) function and a stand-alone function. The TANDEM function stand-alone gateway is a stand-alone gateway for supporting an interworking between heterogeneous lines.

The TANDEM function stand-alone gateway is connected to a private exchange and/or a key telephone system 330 through an internal T1/E1 interface, a loop start trunk interface and an SLC (Subscriber Line Circuit) interface.

The stand-alone type gateway of stand-alone function is connected to a plurality of telephone terminals directly. Accordingly, in connection with the present invention, the VoIP gateway 340 may be the built-in type gateway and the server type gateway which is mounted on a platform such as a window NT (window Network Terminal), and a TANDEM type gateway among the stand-alone type gateways which are independently constructed from other terminals.

The VoIP gateway 340 is connected to gatekeeper 350 through an Internet (IP) network 380.

Main functions of the VoIP gateway 340 are to compress the PCM voice data received from the key telephone/private exchange 330, transform the data into VoIP packets and transmit them to over the Internet network 380, or transform the VoIP packet received from the Internet network 380 into PCM data and transfer the data to the key telephone/private exchange 330.

Here, the VoIP gateway 340 stores a gain value transmitted from the key telephone/private exchange 330. And then, in case that a call setup is completed and there exists a voice data exchange, when transforming PCM voice data into a VoIP packet, the VoIP gateway 340 amplifies and transforms the PCM voice data according to the stored gain value. And, in case of transforming the VoIP packet into the PCM voice data and outputting them, the key telephone/private exchange 330 amplifies the transformed PCM voice data and outputs them.

Of course, in case that a sender is not the key telephone/private exchange 330 but an IP telephone 360 or an external VoIP gateway 400, the VoIP gateway 340 stores a gain value transmitted from the gatekeeper 350, and then in case that the call setup is completed and there exists the voice data exchange, when transforming the PCM voice data into the VoIP packet, amplifies and outputs the PCM data according to the stored gain value. And, in case of transforming the VoIP packet into the PCM voice data and outputting the data, the VoIP gateway 340 amplifies the transformed PCM voice data and outputs them.

The gatekeeper 350 is one of H.323 Entity which is defined in the H.323 protocol being a multimedia communication standard of ITU-T, which is an apparatus for controlling, managing and integrating H.323 end points (gateway, terminal, MCU, and so on) existing in a packet-based network after making them one control area defined as a Zone.

Main functions of the gatekeeper 350 include an address translation function for translating the Alias name or a destination name into a network (IP) address name, a bandwidth control function of a call authentication (RAS) function for properly distributing a protocol related with the gatekeeper 350 and a bandwidth being a limited resource of a network to each end point in the H.323 of Registration/Admission/Status (RAS) and checking if they reaches to a limit values and then performing a blocking, a call control function for connecting/ releasing call between one end point and another end point, and additional maintenance functions such as billing, statistics, and so on.

Such a gatekeeper 350 is connected to the IP telephone 360 through the VoIP gateways 340 and 400 through the IP network 380.

The gatekeeper 350 manages the IP address translation table used for mapping the Internet telephone number and the IP address in order to perform the address translation function, which transmits IP address translation table information to the key telephone/private exchange 330 so that the key telephone/private exchange 330 can make the IP address translation table its database to be stored and managed.

When the gatekeeper 350 receives a call setup request for sharing the VoIP gateway 340 from the IP telephone 360 or the external VoIP gateway 400, it analyses a sender IP address and determines whether the sender is the IP telephone 360 or the external VoIP gateway 400. The gatekeeper 350 identifies information on the type of telephone related the extension number which is transmitted from the key telephone/private exchange 330 (here, called extension telephone number is used) and determines whether the called extension telephone is the analog telephone 310 or the digital telephone 320.

Then, the gatekeeper 350 obtains the gain value by looking up the gain table (Table 1) transmitted from the key telephone/private exchange 330, and transmits the obtained gain value to the VoIP gateway 340.

Here, the IP telephone 360 is also called an Internet telephone which enables users to perform a voice communication in the VoIP net.

Now, an operation of the VoIP system in accordance with an embodiment of the present invention having the construction described above will be explained.

When a user makes a phone call using the analog telephone 310 or the digital telephone 320 and a call passing the VoIP gateway 340 is generated, the key telephone/private exchange 330 identifies the extension number of the telephone making a phone call and determines if the sender telephone is the analog telephone 310 or the digital telephone 320.

Then, the key telephone/private exchange 330 searches for a called telephone number by looking up the IP address translation table transmitted from the gatekeeper 350 and determines if the receiver is the IP telephone 360 or the external VoIP gateway 400.

After then, the key telephone/private exchange 330 identifies a gain value by looking up the gain table (Table 1) and transmits the gain value together with a call setup signal. Of course, the key telephone/private exchange 330 may transmit the call setup signal to the VoIP gateway 340 first, and then transmit the gain value using a special message.

As an example, when a user makes a phone call to the IP telephone 360 using the analog telephone 310, the key telephone/private exchange 330 transmits a gain value of 9 db to the VoIP gateway 340.

As an example, also, when a user makes a phone call to the external VoIP gateway 400 using the digital telephone 320, the key telephone/private exchange 330 transmits a gain value of 13 db to the VoIP gateway 340.

The VoIP gateway 340 which has received a call setup signal including a gain value from the key telephone/private exchange 330 extracts the gain value included in the call setup signal transmitted and stores it in a memory, and transmits the call setup message to the IP telephone 360 or the external VoIP gateway 400. Of course, in case of receiving the gain value from the key telephone/private exchange 330 through a special message, it is possible to extract the gain value from the message transmitted and store it in a memory.

When the VoIP gateway 340 tries to compress and transmit the PCM voice data using a codec in case that a call setup is normally made to the IP telephone 360 or the external VoIP gateway 400, it amplifies the PCM voice data according to the amplification ratio determined in response to the stored gain value before compressing them and then compresses and transmits the amplified PCM data using the codec.

Also, the VoIP gateway 340 transforms the VoIP packet transmitted from the called IP telephone 360 or external VoIP gateway 400 into the PCM voice data and then, according to the amplification ratio determined in response to the stored gain value, amplifies and transmits the PCM voice data to the key telephone/private exchange 330.

In case that an external call is received, for example, when the VoIP gateway 340 receives a call setup signal transmitted from the IP telephone 360 or the VoIP gateway 400, the call setup signal passes through the gatekeeper 350. Here, the gatekeeper 350 identifies the gain value and transmits it to the VoIP gateway 340.

At first, when the gatekeeper 350 receives a signal for requesting a call setup with the telephones 310 and 320 connected to the key telephone/private exchange 330 from the IP telephone 360 or the external VoIP gateway 400, it identifies a sender IP address and determines whether the sender is the IP telephone 360 or the VoIP gateway 400.

The gatekeeper 350 identifies an IP address included in the call setup signal and determines whether the sender requesting the call setup is the IP telephone 360 or the VoIP gateway 400.

The gatekeeper 350 identifies the called telephone number and determines whether the receiver is the analog telephone 310 or the digital telephone 320 using information on the type of telephone related with the extension telephone number received from the key telephone/private exchange 330.

The gatekeeper 350 obtains a gain value by looking up the gain table (Table 1) transmitted from the key telephone/private exchange 330, and transmits the obtained gain value to the VoIP gateway 340.

Then, in case that a call setup is normally made to the analog telephone 310 or the digital telephone 320, the VoIP gateway 340 transforms the VoIP packet into PCM voice data and then, according to the gain value, amplifies and outputs the transformed PCM voice data.

Also, when the VoIP gateway 340 tries to compress and transmit the PCM voice data using the codec, it amplifies the PCM voice data according to the amplification ratio determined in response to the stored gain value before compressing the PCM voice data, and then compresses and transmits the amplified PCM data using the codec.

On the other hand, though the gain value of this embodiment is determined in consideration of the sender and the receiver both, it may be possible to determine the gain value by merely referring to the type of telephones 310 and 320 connected to the key telephone/private exchange 330.

Figure 4:
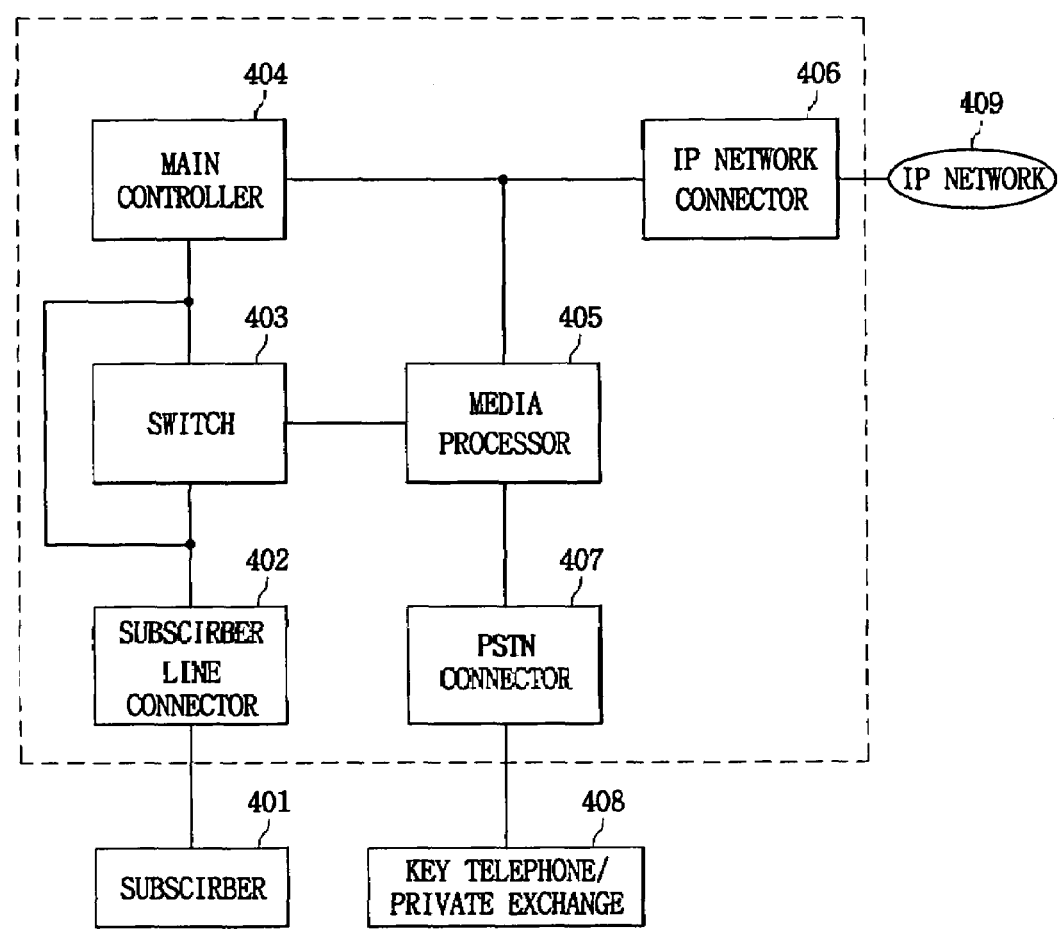
FIG. 4 is a view showing an inner block diagram of a VoIP gateway.

FIG. 4 is a view showing an inner block diagram of a VoIP gateway.

Referring to FIG. 4, the VoIP gateway includes a subscriber line connector 402, a switch 403 for connecting between subscribers who are connected through lines, a media processor 405 for compressing and decompressing common voice, a PSTN connector 407 for connecting to the PSTN and receiving an E1/T1 digital line of a key telephone/private exchange 408, an IP network connector 406 for connecting to the IP network 409, and a main controller 404.

In the VoIP gateway described above, when the PSTN connector 407 interfaced with the key telephone/private exchange 408 requires the main controller 404 to make a call setup with the IP network 409, the main controller 404 checks the state of the IP network 409 and then performs the call setup to the IP network 409 through the IP network connector 406.

The media processor 405 compresses the PCM voice data inputted from the key telephone/private exchange 408 through the PSTN connector 407, and then transmits the data to the IP network connector 406. And, the media processor 405 also decompresses packet data inputted from the IP connector 406 and relays the call to the key telephone/private exchange 408 through the PSTN connector 407.

Here, the main controller 404 extracts and stores a gain value included in a call setup message received from the key telephone/private exchange 408 (a special message may be used) and then provides the media processor 405 with the stored gain value when the call setup is completed.

Then, the media processor 405 amplifies the PCM voice data inputted according to the gain value, and compresses and transmits the amplified PCM voice data as VoIP packets.

Also, the media processor 405 transforms the VoIP packet into the PCM voice data according to the gain value, and then amplifies and outputs the transformed PCM voice data.

On the other hand, when the main controller 404 received an external call setup signal through the IP network connector 406 (of course, the main controller may receives the gain value from the gatekeeper using a special message), it extracts the gain value included in the call setup signal and stores the value, and provides the media processor 405 with the gain value stored after the call setup is completed.

Then, the media processor 405 transforms the VoIP packet into the PCM voice data according to the gain value, and then amplifies and outputs the transformed PCM voice data.

Also, the media processor 405 amplifies the PCM voice data inputted according to the gain value, and then compresses and transmits the amplified PCM voice data as VoIP packets.

Figure 5:
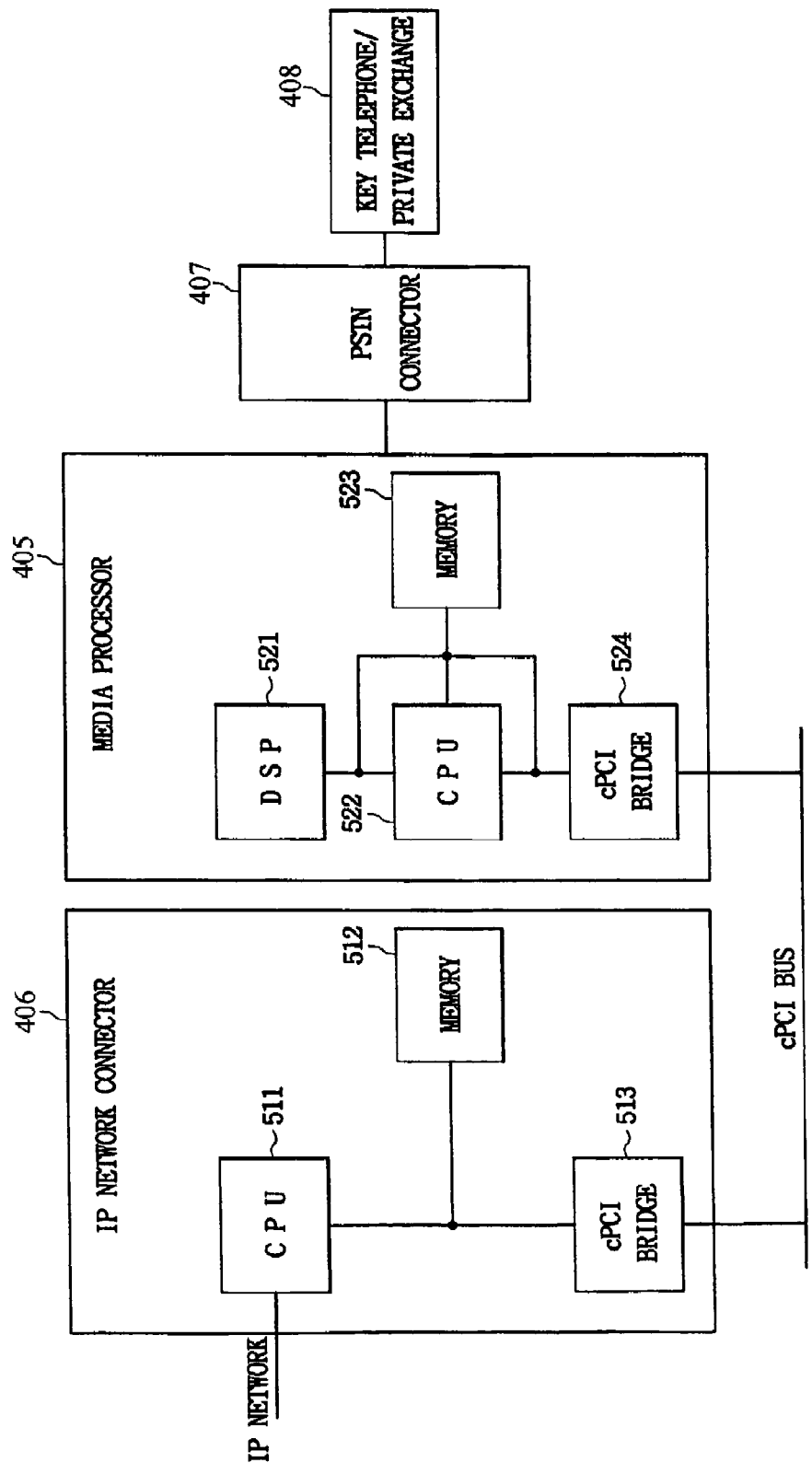
FIG. 5 is a view showing a detailed block construction of an IP network connector and a media processor shown in FIG. 4.

FIG. 5 is a view showing a detailed block construction of the IP network connector and the media processor shown in FIG. 4 and connected to PSTN connector 407 and key telephone/private exchange 408.

Referring to FIG. 5, the IP network connector 406 includes a central processing unit (CPU) 511, a memory 512 and a Compact Peripheral Component Interconnect (cPCI) bridge 513. And, the media processor 405 includes a digital signal processor (DSP) 521, a central processing unit (CPU) 522, a memory 523, and a cPCI bridge 524. The cPCI bridges 513 and 524 are constituents used to match CPU busses.

Here, since a normal media processor 405 has a lower degree of integration of a channel than the IP network connector 406, it is common that one IP network connector 406 is matched with a number of media processors 405. At that time, there occurs a task that a number of hardware PBA (Printed Board Assembly) should be matched with a common bus for voice traffic in a backplane in order that the IP network connector 406 transmits and receives the voice traffic to and from the media processor 405.

It is common to use a cPCI bus in the aspect of a bus band and operating with a current level of technology, and it is necessary to use the CPUs 511 and 522 for operating the bus in case of using the cPCI bus. Here, the CPUs 511 and 522 should be used for transferring voice traffic and also for operating the bus.

The CPU 511 of the IP network connector 406 is used to process the IP protocol and to operate the cPCI bus, and the cPCI bridges 513 is used to match the CPU bus with cPCI bus.

The DSP 521 of the media processor 405 is an essential constituent for embodying vocoding function, and the CPU 522 of the media processor 405 is an essential constituent for controlling the cPCI bridge 524.

The memories 512 and 523 are essential constituents which act as buffers for transmitting and receiving data processed in the CPUs 511 and 522 and the DSP 521.

The cPCI bus is made up of a master and a number of targets wherein an IP network connector 406 acts as the master and a number of media processors act as the targets, in the conventional art.

In connection with the present invention, the CPU 522 of the media processor 405 receives a gain value from the main controller 404 of the VoIP gateway and stores it in the memory 523, and in case of compressing the PCM data inputted from a PSTN connector 407 into the VoIP packet, controls the DSP 521 so that the DSP 521 amplifies the PCM data according to the gain value and then compresses the amplified data.

When the CPU 522 of the media processor 405 transforms the VoIP packet inputted from the IP network connector 406 (FIG. 4) into the PCM data, it controls the DSP 521 so that the DSP 521 amplifies the PCM data according to the gain value stored and outputs the data.

Figure 6:
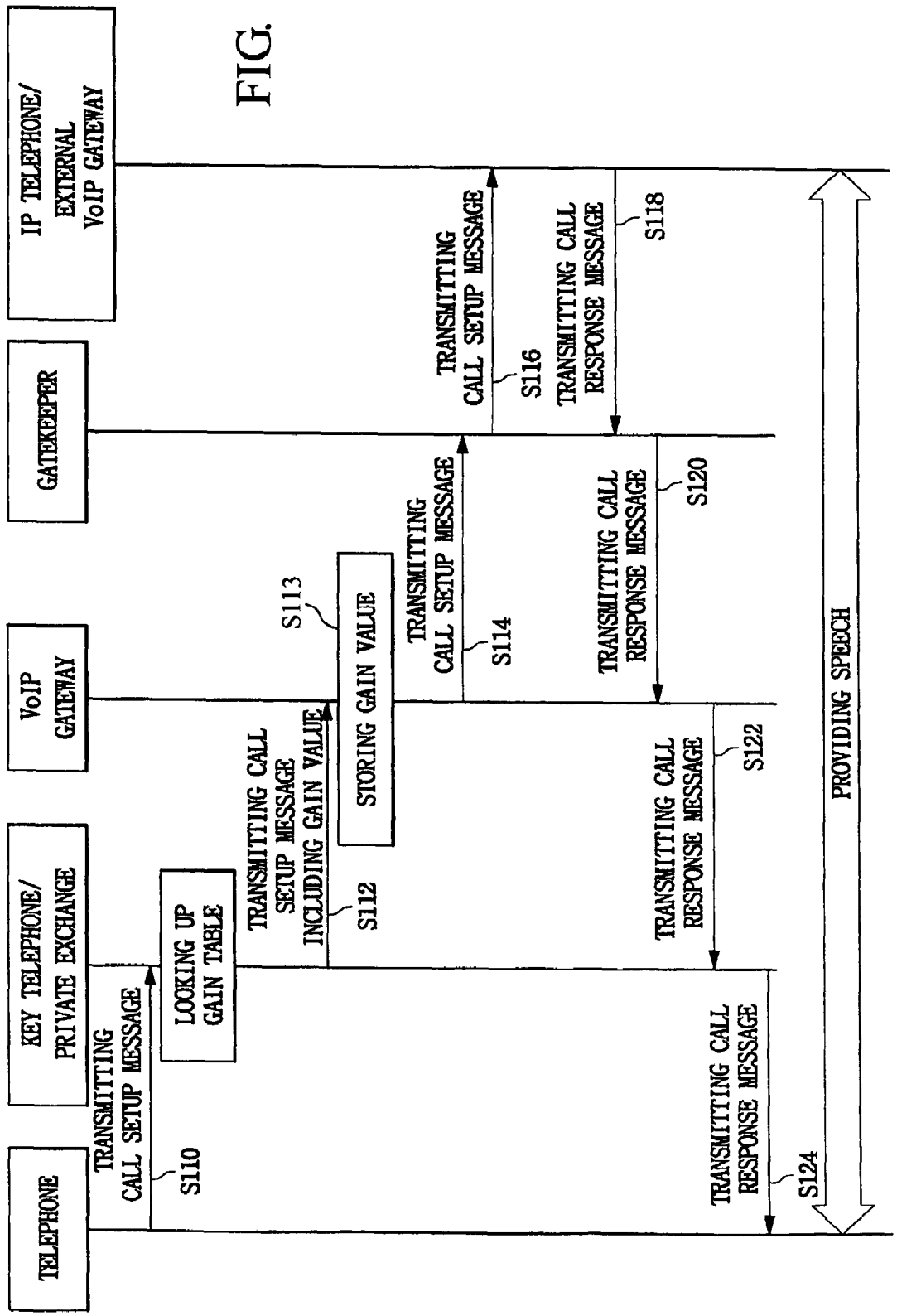
FIG. 6 is a view showing an operation flow chart of a method for providing a dynamic gain in a sender using a VoIP system in accordance with an embodiment of the present invention.

FIG. 6 is a view showing an operation flow chart of a method for providing a dynamic gain in a sender using a VoIP system in accordance with an embodiment of the present invention.

Referring to FIG. 6, when a telephone user makes a phone call which passes through a VoIP gateway using an analog telephone or a digital telephone, the analog telephone or the digital telephone transmit a call setup message including a called telephone number to a key telephone/private exchange (S110).

Then, the key telephone/private exchange identifies an extension number of a sender and determines whether the type of telephone of the sender is an analog telephone or a digital telephone.

Then, the key telephone/private exchange looks up an IP address translation table transmitted from a gatekeeper and determines whether the receiver is an IP telephone or an external VoIP gateway.

Then, according to the determination, the key telephone/private exchange obtains a gain value by looking up a gain table and then transmits the gain value together with the call setup message to the VoIP gateway (S112). The obtained gain value corresponds to either the extension telephone making the call, the terminal (end-point) receiving the call (i.e., the IP telephone or the external VoIP gateway) or both the extension telephone making the call and the terminal (end-point) receiving the call.

Then, the VoIP gateway extracts the gain value from the call setup message, stores the value (S113), and transmits the call setup message to the gatekeeper (S114). The call setup message is then transmitted to the called IP telephone or external VoIP gateway (S116).

Then, when the gatekeeper and the VoIP gateway receive a call response message from the IP telephone or the external VoIP gateway (S118 and S120), the received call response message is transmitted to the key telephone/private exchange and the telephone (S122 and S124).

When the VoIP gateway tries to compress and transmit the PCM voice data using the codec after the call setup has been completed and the call setup has been normally made to the IP telephone or the external VoIP gateway, the VoIP gateway amplifies the PCM voice data according to the amplification ratio determined in response to the stored gain value and then compresses and transmits the amplified PCM data using the codec.

Also, the VoIP gateway transforms the VoIP packet received from the IP telephone or the external VoIP gateway into the PCM voice data, amplifies the PCM voice data according to the amplification ratio determined in response to the stored gain value and transmits the amplified PCM voice data to the key telephone/private exchange.

Figure 7:
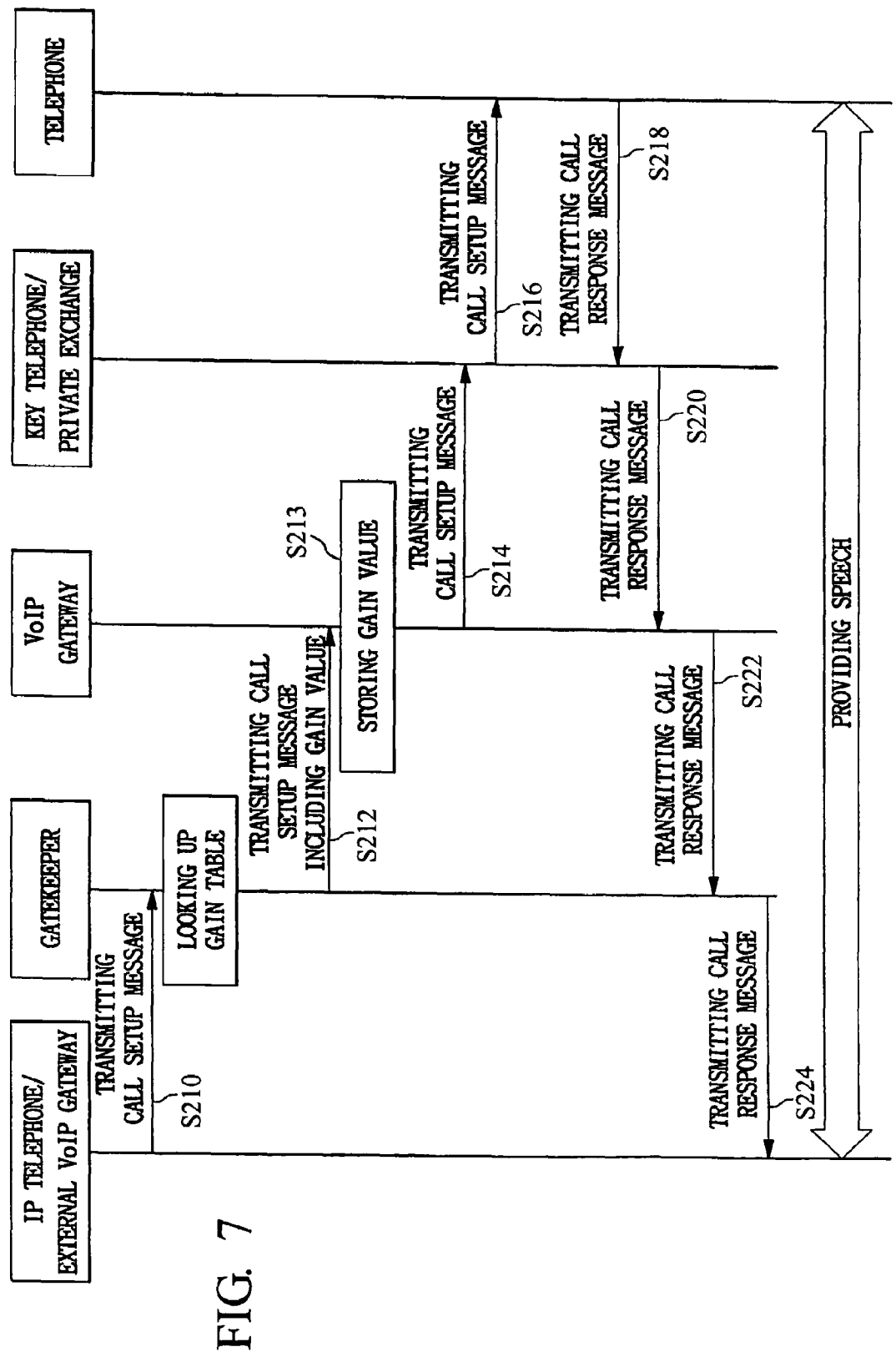
FIG. 7 is a view showing an operation flow chart of a method for providing a dynamic gain in a receiver using a VoIP system in accordance with another embodiment of the present invention.

FIG. 7 is a view showing an operation flow chart of a method for providing a dynamic gain in a receiver using a VoIP system in accordance with another embodiment of the present invention.

Referring to FIG. 7, when a gatekeeper receives a call setup message form an IP telephone or an external VoIP gateway (S210), it identifies an IP address of a sender and determines whether the sender is an IP telephone or an external VoIP gateway by looking up an IP address translation table.

Then, the gatekeeper determines whether a receiver is an analog telephone or a digital telephone using information on the kind of telephone for an extension telephone number transmitted from the key telephone/private exchange. And then, the gatekeeper obtains a gain value by looking up the gain table and transmits the gain value obtained together with the call setup message to the VoIP gateway (S212).

Then, the VoIP gateway extracts the gain value from the call setup message, stores the gain value (S213) and transmits the call setup message to the key telephone/private exchange (S214). The call setup message is then transmitted to the analog telephone or the digital telephone (S216).

Then, when the VoIP gateway receives a call response message from the analog telephone or the digital telephone (S218 and S220), the received call response message is transmitted to the IP telephone or the external VoIP gateway so that the call setup is made (S222 and S224).

Then, as the call setup is completed, the VoIP gateway transforms the VoIP packet transmitted from the IP telephone or the external VoIP gateway into the PCM voice data, amplifies the PCM voice data according to the amplification ratio determined in response to the stored gain value, and then transmits the data to the key telephone/private exchange.

Also, when the VoIP gateway tries to compress the PCM voice data using the codec and transmit the PCM voice data to the IP telephone or the external VoIP gateway, it amplifies the PCM voice data according to the amplification ratio determined in response to the stored gain value, compresses the amplified PCM data using the codec, and then transmits them as VoIP packets.

Even though the present invention explains the case that the key telephone/private exchange, the VoIP gateway and the gatekeeper are close coupled and share information in the database, the same method will be applied to the case that the constituents are not coupled closely.

Although the preferred embodiments of the present invention have been disclosed for illustrative purposes, those skilled in the art appreciate that various modifications, additions and substitutions are possible, without departing from the scope and spirit of the invention as disclosed in the accompanying claims.

EFFECT

In accordance with the present invention, when connecting a call to communication equipment (an IP phone or a VoIP gateway) connected to an external IP network through another VoIP gateway in a key telephone/private exchange, a speech quality can be enhanced by enabling the call to have proper gain values according to the type of terminals to be connected to the call.

What is claimed is:

1. A Voice over Internet Protocol (VoIP) system having a dynamic gain control function and a communication path between a first terminal, the first terminal being an extension telephone of a private exchange, and second terminal of a type operating according to an Internet protocol, the communication path comprising a VoIP gateway connected to said private exchange, and a gatekeeper connected between said VoIP gateway and the second terminal, said VoIP system comprising:

said private exchange including a gain table of gain values and transmitting one of said gain values to said VoIP gateway; and said VoIP gateway receiving the gain value from the private exchange, storing the gain value, amplifying PCM voice data transmitted from the private exchange according to the stored gain value, transforming the amplified PCM voice data into a VoIP packet, transmitting the VoIP packet to said second terminal, transforming VoIP packets transmitted from the said second terminal into transformed PCM voice data, amplifying the transformed PCM voice data according to the stored gain value, and transmitting the amplified PCM voice data to said first terminal of the private exchange.

2. The VoIP system as set forth in claim 1, said gain value being determined based on whether said first terminal is an analog extension telephone or a digital extension telephone.

3. The VoIP system as set forth in claim 1, said gain value being determined based on a type of Internet protocol equipment said second terminal comprises.

4. The VoIP system as set forth in claim 1, said gain value being determined based on whether said second terminal is an Internet telephone or another VoIP gateway.

5. The VoIP system as set forth in claim 1, each said gain value of said gain table being based on whether said first terminal is an analog extension telephone or a digital extension telephone and whether said second terminal is an Internet telephone or another VoIP gateway, the gain value transmitted from said private exchange to said VoIP gateway being determined based on whether said first terminal is an analog extension telephone or a digital extension telephone and whether said second terminal is an Internet telephone or another VoIP gateway.

6. The VoIP system as set forth in claim 1, said gain value being transmitted to said VoIP gateway during transmission of a call setup message between said first and second terminals.

7. The VoIP system as set forth in claim 1, said VoIP gateway comprising:

a Public Switched Telephone Network (PSTN) connector for providing an interface with the private exchange to enable reception and transmission of the PCM voice data;

an Internet network connector for connecting said VoIP gateway to said gatekeeper via an Internet network to enable reception and transmission of the VoIP packets;

a media processor for a) amplifying the PCM voice data from the private exchange through the PSTN connector according to the stored gain value when a call setup is completed, transforming the amplified PCM voice data into the VoIP packet and transmitting the VoIP packet to the second terminal through the Internet network connector, and b) transforming the VoIP packets transmitted from the second terminal through the Internet network connector into the PCM voice data, amplifying the transformed PCM voice data according to the stored gain value, and transmitting the amplified PCM voice data to the private exchange through the PSTN connector; and a main controller for receiving the gain value from the private exchange through the PSTN connector, storing the gain value, and providing the media processor with the stored gain value when the call setup is completed.

8. The VoIP system as set forth in claim 7, wherein the media processor comprises:

a memory for storing the gain value provided by the main controller when the call setup is completed; and a digital signal processor for a) amplifying the PCM voice data according to the gain value stored in said memory when the call setup is completed, transforming the amplified data into the VoIP packet and transmitting the VoIP packet to the Internet network connector, and b) transforming the VoIP packets received through the Internet network connector into the PCM voice data, amplifying the transformed PCM voice data according to the gain value stored in said memory and transmitting the amplified PCM voice data to the PSTN connector; and a central processing unit for receiving the gain value from the main controller, storing the gain value in the memory, and providing the digital signal processor with the gain value stored in said memory when the call setup is completed.

9. The VoIP system as set forth in claim 8, said gain value being transmitted from said private exchange to said VoIP gateway during transmission of a call setup message over said communication path between said first and second terminals.

10. A Voice over Internet Protocol (VoIP) system having a dynamic gain control function and a communication path between a first terminal, the first terminal being an extension telephone of a private exchange, and second terminal of a type operating according to an Internet protocol, the communication path comprising a VoIP gateway connected to said private exchange, and a gatekeeper connected between said VoIP gateway and the second terminal, said VoIP system comprising:

said gatekeeper including a gain table of gain values and transmitting one of said gain values to said VoIP gateway; and said VoIP gateway receiving the gain value from the gatekeeper, storing the gain value, amplifying PCM voice data transmitted from the private exchange according to the stored gain value, transforming the amplified PCM voice data into a VoIP packet, transmitting the VoIP packet to said second terminal, transforming VoIP packets transmitted from the said second terminal into transformed PCM voice data, amplifying the transformed PCM voice data according to the stored gain value, and transmitting the amplified PCM voice data to said first terminal of the private exchange.

11. The VoIP system as set forth in claim 10, said gain value being determined based on whether said first terminal is an analog extension telephone or a digital extension telephone.

12. The VoIP system as set forth in claim 10, said gain value being determined based on a type of Internet protocol equipment said second terminal comprises.

13. The VoIP system as set forth in claim 10, said gain value being determined based on whether said second terminal is an Internet telephone or another VoIP gateway.

14. The VoIP system as set forth in claim 10, each said gain value of said gain table being based on whether said first terminal is an analog extension telephone or a digital extension telephone and whether said second terminal is an Internet telephone or another VoIP gateway, the gain value transmitted from said gatekeeper to said VoIP gateway being determined based on whether said first terminal is an analog extension telephone or a digital extension telephone and whether said second terminal is an Internet telephone or another VoIP gateway.

15. The VoIP system as set forth in claim 10, said gain value being transmitted to said VoIP gateway during transmission of a call setup message between said first and second terminals.

16. The VoIP system as set forth in claim 10, said VoIP gateway comprising:
   a Public Switched Telephone Network (PSTN) connector for providing an interface with the private exchange to enable reception and transmission of the PCM voice data;
   an Internet network connector for connecting said VoIP gateway to said gatekeeper via an Internet network to enable reception and transmission of the VoIP packets;
   a media processor for a) amplifying the PCM voice data from the private exchange through the PSTN connector according to the stored gain value when a call setup is completed, transforming the amplified PCM voice data into the VoIP packet and transmitting the VoIP packet to the second terminal through the Internet network connector, and b) transforming the VoIP packets transmitted from the second terminal through the Internet network connector into the PCM voice data, amplifying the transformed PCM voice data according to the stored gain value, and transmitting the amplified PCM voice data to the private exchange through the PSTN connector; and
   a main controller for receiving the gain value from the gatekeeper through the Internet network connector, storing the gain value, and providing the media processor with the stored gain value when the call setup is completed.

17. The VoIP system as set forth in claim 16, wherein the media processor comprises:
   a memory for storing the gain value provided by the main controller when the call setup is completed; and
   a digital signal processor for a) amplifying the PCM voice data according to the gain value stored in said memory when the call setup is completed, transforming the amplified data into the VoIP packet and transmitting the VoIP packet to the Internet network connector, and b) transforming the VoIP packets received through the Internet network connector into the PCM voice data, amplifying the transformed PCM voice data according to the gain value stored in said memory and transmitting the amplified PCM voice data to the PSTN connector; and
   a central processing unit for receiving the gain value from the main controller, storing the gain value in the memory, and providing the digital signal processor with the gain value stored in said memory when the call setup is completed.

18. The VoIP system as set forth in claim 17, said gain value being transmitted from said gatekeeper to said VoIP gateway during transmission of a call setup message over said communication path between said first and second terminals.

19. A method of controlling a dynamic gain control function in a Voice over Internet Protocol (VoIP) system having a communication path between a first terminal, the first terminal being an extension telephone of a private exchange, and second terminal of a type operating according to an Internet protocol, the communication path comprising a VoIP gateway connected to said private exchange, and a gatekeeper connected between said VoIP gateway and the second terminal, said method comprising steps of:
   transmitting a call setup message to said VoIP gateway, said call setup message including a gain value;
   storing said gain value in a memory of said VoIP gateway;
   amplifying PCM voice data transmitted from the private exchange according to the stored gain value, when call setup is completed, transforming the amplified PCM voice data into a VoIP packet and transmitting the VoIP packet to said second terminal; and
   transforming VoIP packets transmitted from the said second terminal into transformed PCM voice data, when the call setup is completed, amplifying the transformed PCM voice data according to the stored gain value, and transmitting the amplified PCM voice data to said first terminal of the private exchange.

20. The method as set forth in claim 19, the step of transmitting a call setup message to said VoIP gateway comprising:
   determining a whether said first terminal is an analog extension telephone or a digital extension telephone;
   checking a gain table in said branch exchange for a gain value to be transmitted to said VoIP gateway based on the determination of whether said first terminal is the analog extension telephone or the digital extension telephone; and
   attaching said gain value to the call setup message.

21. The method as set forth in claim 19, the step of transmitting a call setup message to said VoIP gateway comprising:
   determining a whether said first terminal is an analog extension telephone or a digital extension telephone;
   checking a gain table in said gatekeeper for a gain value to be transmitted to said VoIP gateway based on the determination of whether said first terminal is the analog extension telephone or the digital extension telephone; and
   attaching said gain value to the call setup message.

22. The method as set forth in claim 19, the step of transmitting a call setup message to said VoIP gateway comprising:
   determining a whether said second terminal is an Internet telephone or another VoIP gateway;
   checking a gain table in said branch exchange for a gain value to be transmitted to said VoIP gateway based on the determination of whether said second terminal is the Internet telephone or another VoIP gateway; and
   attaching said gain value to the call setup message.

23. The method as set forth in claim 19, the step of transmitting a call setup message to said VoIP gateway comprising:
   determining a whether said second terminal is an Internet telephone or another VoIP gateway;
   checking a gain table in said gatekeeper for a gain value to be transmitted to said VoIP gateway based on the determination of whether said second terminal is the Internet telephone or another VoIP gateway; and
   attaching said gain value to the call setup message.

24. The method as set forth in claim 19, the step of transmitting a call setup message to said VoIP gateway comprising:
   checking a gain table in said branch exchange for a gain value to be transmitted to said VoIP gateway based on whether said first terminal is an analog extension telephone or a digital extension telephone and whether said second terminal is an Internet telephone or another VoIP gateway; and attaching said gain value to the call setup message based on whether said first terminal is an analog extension telephone or a digital extension telephone and whether said second terminal is an Internet telephone or another VoIP gateway.

25. The method as set forth in claim 19, the step of transmitting a call setup message to said VoIP gateway comprising:

checking a gain table in said gatekeeper for a gain value to be transmitted to said VoIP gateway based on whether said first terminal is an analog extension telephone or a digital extension telephone and whether said second terminal is an Internet telephone or another VoIP gateway; and attaching said gain value to the call setup message based on whether said first terminal is an analog extension telephone or a digital extension telephone and whether said second terminal is an Internet telephone or another VoIP gateway.

\* \* \* \* \*